(12) United States Patent
Jang et al.

(10) Patent No.: US 10,150,864 B2
(45) Date of Patent: Dec. 11, 2018

(54) IONIZING RADIATION RESISTANT POLYCARBONATE RESIN COMPOSITION AND ARTICLE COMPRISING THE SAME

(71) Applicant: Lotte Advanced Materials Co., Ltd., Yeosu-si (KR)

(72) Inventors: Hyun Hye Jang, Uiwang-si (KR); Woo Suk Chei, Uiwang-si (KR); Jong Chan Hur, Uiwang-si (KR); O Sung Kwon, Uiwang-si (KR); Jun Ho Chi, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 134 days.

(21) Appl. No.: 15/195,058

(22) Filed: Jun. 28, 2016

(65) Prior Publication Data

US 2017/0002197 A1    Jan. 5, 2017

(30) Foreign Application Priority Data

Jun. 30, 2015 (KR) ..................... 10-2015-0093812
May 25, 2016 (KR) ..................... 10-2016-0064374

(51) Int. Cl.
*C08L 69/00* (2006.01)
*C08K 5/00* (2006.01)

(52) U.S. Cl.
CPC .................................. *C08L 69/00* (2013.01)

(58) Field of Classification Search
CPC ....................................................... C08L 69/00
USPC ........................................................ 524/358
See application file for complete search history.

(56) References Cited

U.S. PATENT DOCUMENTS

| | | | |
|---|---|---|---|
| 3,260,760 A | 7/1966 | Domen et al. | |
| 3,475,373 A | 10/1969 | Jackson, Jr. et al. | |
| 3,489,716 A * | 1/1970 | Calkins | C08K 5/1515 524/109 |
| 3,978,020 A | 8/1976 | Liberti | |
| 4,066,611 A | 1/1978 | Axelrod | |
| 4,092,288 A * | 5/1978 | Calkins | C08K 5/50 524/154 |
| 4,760,107 A * | 7/1988 | Nelson | C08K 5/053 523/447 |
| 4,847,312 A | 7/1989 | Lundy et al. | |
| 4,894,401 A | 1/1990 | Nelson | |
| 5,274,009 A | 12/1993 | Grigo et al. | |
| 5,382,605 A | 1/1995 | Powell et al. | |
| 5,464,893 A | 11/1995 | Archey et al. | |
| 5,612,398 A | 3/1997 | Fennhoff et al. | |
| 5,684,062 A | 11/1997 | Ebert et al. | |
| 5,773,491 A | 6/1998 | Ebert et al. | |
| 5,948,838 A | 9/1999 | Miya et al. | |
| 6,040,367 A | 3/2000 | Miya et al. | |
| 7,297,380 B2 | 11/2007 | Coenjarts et al. | |
| 7,511,114 B2 * | 3/2009 | Miyamoto | C08K 5/0041 428/34.1 |
| 7,649,039 B2 | 1/2010 | Glasgow et al. | |
| 9,758,670 B2 * | 9/2017 | Van Zyl | C08L 69/005 |
| 2003/0083405 A1 | 5/2003 | Wang et al. | |
| 2005/0014878 A1 * | 1/2005 | Schottland | C08K 5/18 524/242 |
| 2007/0100021 A1 | 5/2007 | Glasgow et al. | |
| 2007/0100038 A1 | 5/2007 | Glasgow et al. | |
| 2007/0117957 A1 * | 5/2007 | Mullen | A61L 2/081 528/196 |
| 2008/0081895 A1 * | 4/2008 | Lens | C08G 64/186 528/196 |

FOREIGN PATENT DOCUMENTS

| | | |
|---|---|---|
| CN | 1980998 A | 6/2007 |
| CN | 101317106 A | 12/2008 |
| EP | 0535464 A2 | 4/1993 |
| EP | 0572889 A1 | 12/1993 |
| EP | 0611797 A1 | 8/1994 |
| EP | 0664321 A1 | 7/1995 |
| EP | 0732365 A1 | 9/1996 |
| EP | 0742260 A1 | 11/1996 |
| EP | 0794218 A1 | 9/1997 |
| EP | 1951802 B1 | 7/2010 |

(Continued)

OTHER PUBLICATIONS

Office Action in commonly owned U.S. Appl. No. 14/943,542 dated Nov. 23, 2016, pp. 1-18.
Office Action in commonly owned Korean Application No. 10-2014-0161214 dated Dec. 12, 2016, pp. 1-4.
Final Office Action in commonly owned U.S. Appl. No. 14/943,542 dated May 16, 2017, pp. 1-22.
EPO Machine translated English language equivalent of JP 04-11653 (1992, 6 pages).
Office Action in commonly owned Chinese Application No. 201510794558.6 dated Mar. 13, 2017, pp. 1-6.
Office Action in commonly owned Korean Application No. 10-2016-0018067 dated Aug. 14, 2017, pp. 1-5.
Office Action in commonly owned U.S. Appl. No. 15/078,219 dated Nov. 15, 2017, pp. 1-27.
Office Action in counterpart Korean Application No. 10-2016-0064374 dated Jan. 4, 2018, pp. 1-5.

(Continued)

*Primary Examiner* — Michael Bernshteyn
(74) *Attorney, Agent, or Firm* — Additon, Higgins & Pendleton, P.A.

(57) ABSTRACT

Disclosed herein is a polycarbonate resin composition. The polycarbonate resin composition includes: a polycarbonate resin; a polyalkylene glycol compound; and an anthraquinone colorant, wherein the polycarbonate resin composition has a yellow index (YI) of about −2 to about 2, as measured in accordance with ASTM D1925 after irradiating an about 3.2 mm thick specimen with γ-rays at about 25 kGy and leaving the specimen for 7 days and has an a* value of about −2 to about 2 and a b* value of −2 to about 2 as measured in accordance with ASTM D2244 after irradiating an about 3.2 mm thick specimen with γ-rays at about 25 kGy and leaving the specimen for 7 days. The polycarbonate resin composition can exhibit excellent properties in terms of color, transparency, and impact resistance after being irradiated with ionizing radiation.

8 Claims, No Drawings

(56) References Cited

FOREIGN PATENT DOCUMENTS

| | | | |
|---|---|---|---|
| JP | 53-213553 | | 9/1988 |
| JP | 04-011653 | | 1/1992 |
| JP | 05117516 A | * | 5/1993 |
| JP | 05117516 A | * | 5/1993 |
| JP | 08-120171 | | 5/1996 |
| JP | 09-059504 A | | 3/1997 |
| JP | 09-087506 A | | 3/1997 |
| JP | 2010138263 A | * | 6/2010 |
| JP | 2012-207230 A | | 10/2012 |
| KR | 10-2008-0081905 A | | 9/2008 |
| KR | 10-2012-0077665 A | | 7/2012 |
| KR | 10-2015-0037741 A | | 4/2015 |

OTHER PUBLICATIONS

Machine translated English language equivalent of JP 08-120171 (May 1996, 4 pages).
Derwent Abstract of JP 63-213553 (Acc. No. 1988-176590, 1993, 3 pages).
Non-Final Office Action in commonly owned U.S. Appl. No. 14/943,542 dated Feb. 21, 2018, pp. 1-22.
Office Action in counterpart Chinese Application No. 201610499400.0 dated Nov. 3, 2017, pp. 1-7.
English-translation of Office Action in counterpart Chinese Application No. 201610499400.0 dated Nov. 3, 2017, pp. 1-9.

* cited by examiner

IONIZING RADIATION RESISTANT POLYCARBONATE RESIN COMPOSITION AND ARTICLE COMPRISING THE SAME

CROSS-REFERENCE TO RELATED APPLICATION

This application claims priority under 35 USC Section 119 to and the benefit of Korean Patent Application No. 10-2015-0093812, filed on Jun. 30, 2015, and Korean Patent Application No. 10-2016-0064374, filed on May 25, 2016, the entire disclosure of each of which is incorporated herein by reference.

FIELD

The present invention relates to an ionizing radiation resistant polycarbonate resin composition and a molded article including the same.

BACKGROUND

Polycarbonate resins have good mechanical and thermal properties and are thus used in a variety of applications. Particularly, polycarbonate resins can exhibit excellent properties in terms of transparency, hygiene, stiffness, and heat resistance and are thus widely used as a material for medical supplies such as medical devices, surgical instruments, and surgical appliances.

Such medical supplies require sterilization. Sterilization methods include contact treatment using sterilization gases such as ethylene oxide, heat treatment in an autoclave, and irradiation treatment using ionizing radiation such as γ-rays, electron beams, and X-rays.

Ethylene oxide used in contact treatment, however, is toxic and unstable and thus there can be environmental problems with the disposal thereof. Heat treatment in an autoclave can cause degradation of a resin during high temperature treatment and requires high energy costs and a drying process for removing residual moisture from treated components. Thus, irradiation treatment using ionizing radiation, which allows treatment at low temperature and is relatively economical, is generally used for sterilization.

Generally, polycarbonate resins suffer from yellowing and deterioration in physical properties when irradiated with ionizing radiation. To overcome these problems, there have been proposed a method of blending a polycarbonate resin with other polymers, a method of adding various additives to a polycarbonate resin, and a method of copolymerizing a polycarbonate resin. See for example Korean Patent Publication No. 10-2012-0077665.

However, these methods have failed to completely solve problems such as yellowing and deterioration in physical properties.

Therefore, there is a need for a polycarbonate resin composition which exhibits excellent properties in terms of color, transparency, and impact resistance after being irradiated with ionizing radiation such that liquid level or color of contents such as chemicals or blood in a molded article can be easily distinguished.

SUMMARY OF THE INVENTION

Embodiments provide a polycarbonate resin composition that can exhibit excellent properties in terms of color, transparency, and impact resistance after irradiation with ionizing radiation, and a molded article including the same.

In exemplary embodiments, the polycarbonate resin composition includes: a polycarbonate resin; a polyalkylene glycol compound; and an anthraquinone colorant, wherein the polycarbonate resin composition has a yellow index (YI) of about −2 to about 2, as measured in accordance with ASTM D1925 after irradiating an about 3.2 mm thick specimen with γ-rays at about 25 kGy and leaving the specimen for 7 days and has an a* value of about −2 to about 2 and a b* value of −2 to about 2 as measured in accordance with ASTM D2244 after irradiating an about 3.2 mm thick specimen with γ-rays at about 25 kGy and leaving the specimen for 7 days.

In exemplary embodiments, the polyalkylene glycol compound may be present in an amount of about 0.4 parts by weight to about 1 parts by weight based on about 100 parts by weight of the polycarbonate resin, and the anthraquinone colorant may be present in an amount of about 0.0001 parts by weight to about 0.002 parts by weight based on about 100 parts by weight of the polycarbonate resin.

In exemplary embodiments, the anthraquinone colorant may include a red anthraquinone colorant and a violet anthraquinone colorant in a weight ratio of about 1:about 1 to about 1:about 2.

In exemplary embodiments, the polycarbonate resin composition may further include an epoxy ester compound represent by Formula 1:

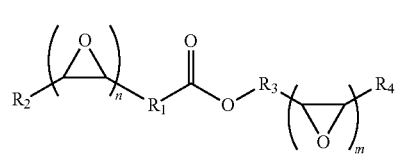

[Formula 1]

wherein $R_1$ and $R_3$ are the same or different and are each independently a $C_1$ to $C_{10}$ hydrocarbon group; $R_2$ and $R_4$ are the same or different and are each independently a hydrogen atom or a $C_1$ to $C_{10}$ hydrocarbon group, wherein $R_1$ and $R_2$ are optionally connected to one another to form a ring (that is, $R_1$ and $R_2$ may or may not be connected to one another to form a ring) and/or wherein $R_3$ and $R_4$ are optionally connected to one another to form a ring (that is, $R_3$ and $R_4$ may or may not be connected to one another to form a ring); m and n are the same or different and are each independently 0 or 1; and m+n is 1 or 2.

In exemplary embodiments, the epoxy ester compound may be present in an amount of about 0.001 parts by weight to about 3 parts by weight based on about 100 parts by weight of the polycarbonate resin.

In exemplary embodiments, the polycarbonate resin composition may have a transmittance of about 80% or higher, as measured in accordance with ASTM D1003 after irradiating an about 3.2 mm thick specimen with γ-rays at about 25 kGy and leaving the specimen for about 7 days.

In exemplary embodiments, the polycarbonate resin composition may have an Izod impact strength of about 90 kgf·cm/cm or higher, as measured in accordance with ASTM D256 after irradiating an about 3.2 mm thick Izod specimen with γ-rays at about 25 kGy and leaving the specimen for about 7 days.

Other embodiments relate to a molded article formed of the polycarbonate resin composition as set forth above.

In exemplary embodiments, the molded article may be an ionizing radiation resistant medical supply article.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate resin composition according to the present invention can have ionizing radiation resistance and includes: a polycarbonate resin; a polyalkylene glycol compound; and an anthraquinone colorant, wherein the polycarbonate resin composition has a yellow index (YI) of about −2 to about 2, as measured in accordance with ASTM D1925 after irradiating an about 3.2 mm thick specimen with γ-rays at about 25 kGy and leaving the specimen for 7 days and has an a* value of about −2 to about 2 and a b* value of −2 to about 2 as measured in accordance with ASTM D2244 after irradiating an about 3.2 mm thick specimen with γ-rays at about 25 kGy and leaving the specimen for 7 days.

The polycarbonate resin may include any suitable polycarbonate resin such as an aromatic polycarbonate resin used in a typical polycarbonate resin composition. The polycarbonate resin may be prepared by a typical method, for example, by reacting a dihydric phenol compound with phosgene in the presence of a molecular weight regulator and a catalyst, or through transesterification of a dihydric phenol compound and a carbonate precursor such as diphenyl carbonate.

In preparation of the polycarbonate resin, the dihydric phenol compound may be a bisphenol compound, for example, 2,2-bis(4-hydroxyphenyl)propane (hereinafter, "bisphenol A"). Here, the bisphenol A may be partially or completely replaced by one or more other dihydric phenol compounds. Examples of other dihydric phenol compounds may include without limitation hydroquinone, 4,4'-biphenol, bis(4-hydroxyphenyl)methane, 1,1-bis(4-hydroxyphenyl)cyclohexane, 2,2-bis(3,5-dimethyl-4-hydroxyphenyl)propane, 2,2-bis(3-methyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, halogenated bisphenol, such as bis(4-hydroxyphenyl)ether or 2,2-bis(3,5-dibromo-4-hydroxyphenyl)propane, and the like, and mixtures thereof. However, the dihydric phenol compound that can be used for preparation of the polycarbonate resin is not limited thereto, and the polycarbonate resin may be prepared using any suitable dihydric phenol compound.

In addition, the polycarbonate resin may be a homopolymer using one dihydric phenol compound, a copolymer using at least two dihydric phenol compounds, or a mixture thereof.

Generally, a polycarbonate resin may be a linear polycarbonate resin, a branched polycarbonate resin, and/or a polyester carbonate copolymer resin. The polycarbonate resin included in the polycarbonate resin composition is not particularly limited and may include such linear polycarbonate resins, branched polycarbonate resins, and/or polyester carbonate copolymer resins.

For example, the linear polycarbonate resin may be a bisphenol A polycarbonate resin, and the branched polycarbonate resin may be prepared by, for example, reacting a polyfunctional aromatic compound such as trimellitic anhydride or trimellitic acid with a dihydric phenol compound and a carbonate precursor. The polyester carbonate copolymer resin may be prepared by, for example, reacting a bifunctional carboxylic acid with a dihydric phenol and a carbonate precursor. In addition, the polycarbonate resin may include typical linear polycarbonate resins, branched polycarbonate resins, and/or polyester carbonate copolymer resins without limitation.

In exemplary embodiments, the polycarbonate resin may include a terminal modified polycarbonate resin having a tert-butylphenoxy group at a terminal thereof. The terminal modified polycarbonate resin may be prepared by a typical method for preparing a polycarbonate resin except that tert-butylphenol is added during the preparation of a polycarbonate resin. When the terminal modified polycarbonate resin is included in the composition, the tert-butylphenoxy group may be present in an amount of about 0.1 mole % to about 80 mole %, for example, about 20 mole % to about 60 mole %, in the polycarbonate resin. Within this range, the polycarbonate resin composition can exhibit further enhanced properties in terms of ionizing radiation resistance, impact resistance, and the like.

In exemplary embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography (GPC), without being limited thereto.

In addition, the polycarbonate resin may have a melt flow index (MI) of about 3 g/10 min to about 35 g/10 min, as measured in accordance with ISO 1133 (at about 300° C. under a load of about 1.2 kg), without being limited thereto.

The polyalkylene glycol compound may include polyalkylene glycol, ethers of polyalkylene glycol, and/or esters of polyalkylene glycol. The polyalkylene glycol compound may include any polyols used in a typical ionizing radiation resistant composition. Examples of the polyols may include polyethylene glycol, polyethylene glycol methyl ether, polyethylene glycol dimethyl ether, polyethylene glycol dodecyl ether, polyethylene glycol benzyl ether, polyethylene glycol dibenzyl ether, polyethylene glycol-4-nonylphenyl ether, polypropylene glycol, polypropylene glycol methyl ether, polypropylene glycol dimethyl ether, polypropylene glycol dodecyl ether, polypropylene glycol benzyl ether, polypropylene glycol dibenzyl ether, polypropylene glycol-4-nonylphenyl ether, polytetramethylene glycol, polyethylene glycol diacetate ester, polyethylene glycol acetate propionate ester, polyethylene glycol dibutyrate ester, polyethylene glycol distearate ester, polyethylene glycol dibenzoate ester, polyethylene glycol di-2,6-dimethyl benzoate ester, polyethylene glycol di-p-tert-butyl benzoate ester, polyethylene glycol dicaprylate ester, polypropylene glycol diacetate ester, polypropylene glycol acetate propionate ester, polypropylene glycol dibutyrate ester, polypropylene glycol distearate ester, polypropylene glycol dibenzoate ester, polypropylene glycol di-2,6-dimethyl benzoate ester, polypropylene glycol di-p-tert-butyl benzoate ester, polypropylene glycol dicaprylate ester, and the like, without being limited thereto. These may be used alone or as a mixture thereof.

In exemplary embodiments, the polyalkylene glycol compound may have a number average molecular weight (Mn) of about 1,000 g/mol to about 5,000 g/mol, for example, about 1,500 g/mol to about 3,000 g/mol, as measured by gel permeation chromatography (GPC). Within this range, the polycarbonate resin composition can exhibit excellent properties in terms of impact resistance, discoloration resistance, and the like after being irradiated with ionizing radiation.

In exemplary embodiments, the polycarbonate resin composition can include the polyalkylene glycol compound in an amount of about 0.4 parts by weight to about 1 part by weight, for example, about 0.5 parts by weight to about 0.95 parts by weight, based on about 100 parts by weight of the polycarbonate resin. In some embodiments, the polycarbonate resin composition can include the polyalkylene glycol compound in an amount of about 0.4, 0.45, 0.5, 0.55, 0.6, 0.65, 0.7, 0.75, 0.8, 0.85, 0.9, 0.95, or 1 part by weight. Further, according to some embodiments, the amount of the polyalkylene glycol compound can be in a range from about any of the foregoing amounts to about any other of the foregoing amounts.

Within this range, the polycarbonate resin composition can exhibit excellent properties in terms of impact resistance, discoloration resistance, and the like after being irradiated with ionizing radiation.

The anthraquinone colorant allows the polycarbonate resin composition (or a molded article including the resin composition) to be nearly colorless after being irradiated with ionizing radiation and thus can reduce deterioration in transparency.

In exemplary embodiments, the anthraquinone colorant may include a red anthraquinone colorant and a violet anthraquinone colorant in a weight ratio of about 1:about 1 to about 1:about 2, for example, about 1:about 1.3 to about 1:about 1.7. Within this range of weight ratio, the polycarbonate resin composition can exhibit excellent properties in terms of color, transparency, and the like after being irradiated with ionizing radiation.

Examples of the red anthraquinone colorant may include without limitation solvent red 195 of the following structure below

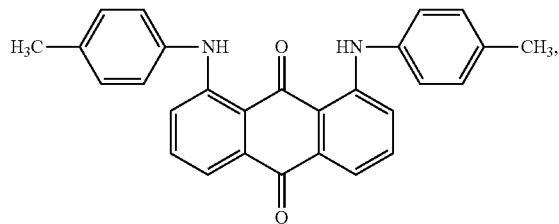 [SMILES: Cc1ccc(Nc2cccc3c2C(=O)c2c(Nc4ccc(C)cc4)cccc2C3=O)cc1]

pigment red 177 of the following structure below

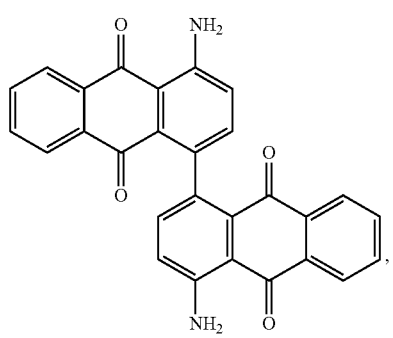 [SMILES: Nc1ccc(-c2ccc(N)c3c2C(=O)c2ccccc2C3=O)c2c1C(=O)c1ccccc1C2=O]

1-(methylamino)anthraquinone, and the like, and mixtures thereof.

Examples of the violet anthraquinone colorant may include without limitation disperse violet 26 of the following structure below

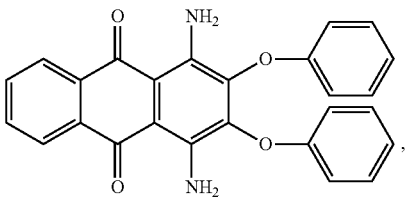 [SMILES: Nc1c(Oc2ccccc2)c(Oc2ccccc2)c(N)c2c1C(=O)c1ccccc1C2=O]

acid violet 34 of the following structure below

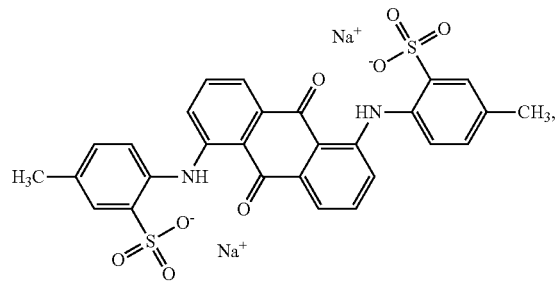

a compound of the following structure below

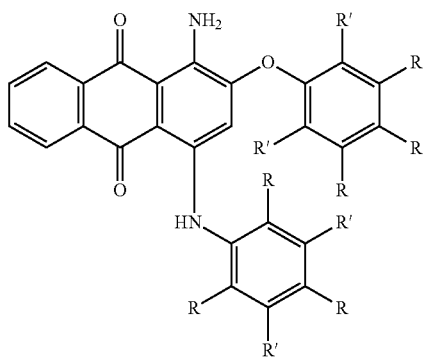

wherein each R is the same or different and each is independently a hydrogen atom, a methyl group, a tert-butyl group, or an isooctyl group, and each R' is the same or different and each is independently a hydrogen atom or —SO$_3$Na, and the like, and mixtures thereof.

In exemplary embodiments, the polycarbonate resin composition can include the anthraquinone colorant in an amount of about 0.0001 parts by weight to about 0.002 parts by weight, for example, about 0.0005 parts by weight to about 0.0015 parts by weight, and as another example about 0.0007 parts by weight to about 0.0011 parts by weight, based on about 100 parts by weight of the polycarbonate resin. In some embodiments, the polycarbonate resin composition can include the anthraquinone colorant in an amount of about 0.0001, 0.0002, 0.0003, 0.0004, 0.0005, 0.0006, 0.0007, 0.0008, 0.0009, 0.001, or 0.002 parts by weight. Further, according to some embodiments, the amount of the anthraquinone colorant can be in a range from about any of the foregoing amounts to about any other of the foregoing amounts.

Within this range, the polycarbonate resin composition can exhibit excellent properties in terms of color, transparency, and the like after being irradiated with ionizing radiation.

The polycarbonate resin composition according to exemplary embodiments of the present invention may further include an epoxy ester compound including an ester group and an epoxy group.

In exemplary embodiments, the epoxy ester compound can improve ionizing radiation resistance with minimal or no deterioration in hydrolysis resistance and may include, for example, a compound represented by the following Formula 1:

[Formula 1]

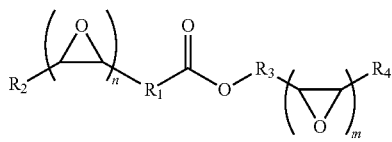

wherein in Formula 1, $R_1$ and $R_3$ are the same or different and are each independently a $C_1$ to $C_{10}$ hydrocarbon group; $R_2$ and $R_4$ are the same or different and are each independently a hydrogen atom or a $C_1$ to $C_{10}$ hydrocarbon group; $R_1$ and $R_2$ are optionally connected to one another to form a ring (that is, $R_1$ and $R_2$ may or may not be connected to one another to form a ring) and/or $R_3$ and $R_4$ are optionally connected to one another to form a ring (that is, $R_3$ and $R_4$ may or may not be connected to one another to form a ring); m and n are the same or different and are each independently 0 or 1; and m+n is 1 or 2.

As used herein, the term $C_1$ to $C_{10}$ hydrocarbon group refers to substituted or unsubstituted $C_1$ to $C_{10}$ alkyl group, $C_3$ to $C_{10}$ cycloalkyl group, $C_5$ to $C_{10}$ aryl group, $C_1$ to $C_{10}$ alkylene group, $C_3$ to $C_{10}$ cycloalkylene group, and/or $C_5$ to $C_{10}$ arylene group. Also as used herein, the term "substituted" refers to one or more hydrogen atoms substituted with a substituent such as a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof, and the term "hetero" refers to one or more of N, S, O and/or P atoms in place of a hydrogen atom.

Examples of the epoxy ester compound including an ester group and an epoxy group may include one or more compounds represented by Formulas 1a to 1c, without being limited thereto:

[Formula 1a]

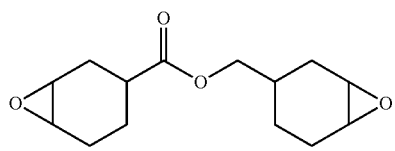

[Formula 1b]

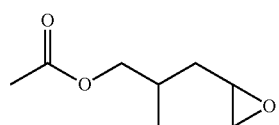

[Formula 1c]

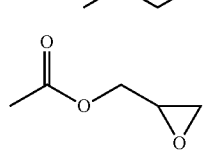

In exemplary embodiments, when present, the polycarbonate resin composition can include the epoxy ester compound including an ester group and an epoxy group in an amount of about 0.001 parts by weight to about 3 parts by weight, for example, about 0.01 parts by weight to about 2 parts by weight, based on about 100 parts by weight of the polycarbonate resin. In some embodiments, the polycarbonate resin composition can include the epoxy ester compound in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments, the amount of the epoxy ester compound can be in a range from about any of the foregoing amounts to about any other of the foregoing amounts.

Within this range, the polycarbonate resin composition can exhibit excellent properties in terms of discoloration resistance with minimal or no deterioration in hydrolysis resistance and thermal stability after being irradiated with ionizing radiation.

The polycarbonate resin composition according to one embodiment may further include one or more other resins without altering advantageous effects of the present invention. For example, the polycarbonate resin composition may further include polyethylene terephthalate, polybutylene terephthalate, and/or polyester polycarbonate, without being limited thereto.

When other resins are used, such other resins may be present in an amount of about 50 parts by weight or less, for example, about 1 part by weight to about 15 parts by weight, based on about 100 parts by weight of the polycarbonate resin, without being limited thereto. In some embodiments, the polycarbonate resin composition can include the other resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments, the amount of the other resin can be in a range from about any of the foregoing amounts to about any other of the foregoing amounts.

In addition, the polycarbonate resin composition may further optionally include one or more of any suitable additives generally used in a resin composition. Examples of the additives may include fillers, reinforcing agents, stabilizers, colorants, antioxidants, antistatic agents, flow enhancers, release agents, and/or nucleating agents, without being limited thereto. When the additives are used, the additives may be present in an amount of about 25 parts by weight or less, for example, about 10 parts by weight or less, based on about 100 parts by weight of the polycarbonate resin, without being limited thereto.

The polycarbonate resin composition may be prepared by any known method for preparing a thermoplastic resin composition. For example, the polycarbonate resin composition may be prepared in pellet form by mixing the above components and optionally other additives by a typical method, followed by melt extrusion using a twin screw extruder or the like. The prepared pellets may be formed into various molded articles through various molding methods, such as injection molding, extrusion molding, vacuum molding, cast molding, and the like.

The polycarbonate resin composition may have a yellow index (YI) of about −2 to about 2, for example, about −1 to about 1, and as another example about 0, as measured in accordance with ASTM D1925 after irradiating an about 3.2 mm thick specimen with γ-rays at about 25 kGy and leaving the specimen for 7 days. The polycarbonate resin composition may have an a* value of about −2 to about 2, for example, about −1 to about 1, and as another example about 0 and a b* value of −2 to about 2, for example, about −1 to about 1, and as another example about 0, as measured in accordance with ASTM D2244 after irradiating an about 3.2 mm thick specimen with γ-rays at about 25 kGy and leaving the specimen for 7 days. If the yellow index (YI) and the a* and b* values exceed about 2 or are below about −2, this can make it difficult to distinguish liquid level or color of contents such as chemicals and blood in a molded article produced using the polycarbonate resin composition while causing the molded article to exhibit poor appearance characteristics.

In exemplary embodiments, the polycarbonate resin composition may have a transmittance of about 80% or higher, for example, about 80% to about 95%, as measured in accordance with ASTM D1003 after irradiating an about 3.2 mm thick specimen with γ-rays at about 25 kGy and leaving the specimen for about 7 days. Within this range of transmittance, liquid level or color of contents such as chemicals and blood in the molded article can be easily distinguished.

In exemplary embodiments, the polycarbonate resin composition may have a notched Izod impact strength of about 90 kgf·cm/cm or higher, for example, about 95 kgf·cm/cm to about 110 kgf·cm/cm, as measured in accordance with ASTM D256 after irradiating an about 3.2 mm thick Izod specimen with γ-rays at about 25 kGy and leaving the specimen for about 7 days.

A molded article according to the present invention may be produced (formed) from the ionizing radiation resistant polycarbonate resin composition as set forth above by any known molding method. The molded article can have excellent properties in terms of color, transparency, impact resistance, and the like after being irradiated with ionizing radiation and thus may be used in ionizing radiation resistant medical supplies including without limitation: container shaped packaging means for receiving or packaging syringes, surgical instruments, intravenous injectors, and surgical appliances; components of medical apparatuses, such as artificial lungs, artificial kidneys, anesthesia inhalers, intravenous connectors, hemodialyzers, hemofilters, safety syringes, and accessories thereof; and components of blood centrifuges, surgical instruments, surgical appliances, and intravenous injectors.

Next, the present invention will be described in more detail with reference to the following examples. It should be understood that these examples are provided for illustration only and are not to be in any way construed as limiting the present invention.

In addition, descriptions of details apparent to those skilled in the art will be omitted for clarity.

EXAMPLE

Details of each component used in the following Examples and Comparative Examples are as follows:

(A) Polycarbonate Resin

A bisphenol A-type polycarbonate resin (weight average molecular weight (Mw): 28,000 g/mol, melt flow index (MI): 8 g/10 min (at 300° C. under a load of 1.2 kg)) is used.

(B) Polyalkylene Glycol Compound

Polypropylene glycol (number average molecular weight (Mn): 2,000 g/mol) is used.

(C) Anthraquinone Colorant (C1) A red anthraquinone colorant, solvent red 195 having the structure below, is used.

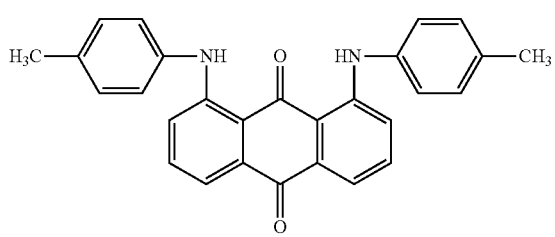

(C2) A violet anthraquinone colorant, disperse violet 26 having the structure below, is used.

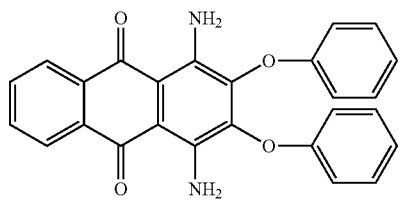 [SMILES: Nc1c(Oc2ccccc2)c(Oc2ccccc2)c(N)c2c1C(=O)c1ccccc1C2=O]

(D) Colorant (D1) Solvent Red 179 having the structure below available from Lanxess Corporation is used.

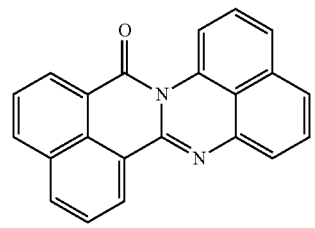 [SMILES: O=c1c2cccc3cccc(c32)c2nc3cccc4cccc(c43)n12]

(D2) Pigment violet 29 having the structure below available from BASF SE is used.

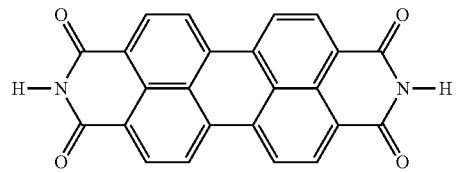 [SMILES: O=C1NC(=O)c2ccc3c4ccc5c6c(ccc(c7ccc1c2c73)c64)C(=O)NC5=O]

(E) Epoxy Ester Compound

A compound represented by Formula 1a is used

[Formula 1a]

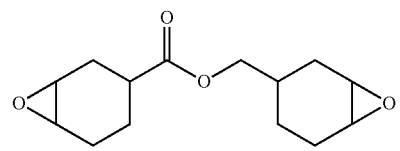

Examples 1 to 6 and Comparative Examples 1 to 5: Preparation and Evaluation of Polycarbonate Resin Composition According to compositions and amounts as listed in Tables 1 and 2, (A) a polycarbonate resin, (B) a polyalkylene glycol compound, (C) an anthraquinone colorant, (D) a colorant, and (E) an epoxy ester compound are mixed, followed by extrusion molding using a twin-screw type extruder (L/D=36, Φ=32 mm) at 260° C. and preparation of a polycarbonate resin composition in pellet form using a pelletizer. The polycarbonate resin composition prepared in pellet form is dried in an oven at 120° C. for 4 hours, followed by injection molding using an injection molding machine (DHC 120WD, Dongshin Hydraulics Co., Ltd.) under conditions of a molding temperature of 270° C. and a mold temperature of 70° C., thereby preparing a specimen. The prepared specimen is evaluated as to the following properties, and results are shown in Tables 1 and 2.

Property Evaluation (1) Yellow index (YI) and a* and b* after irradiation with γ-rays: Yellow index and a* and b* values are measured on a 3.2 mm thick specimen in accordance with ASTM D1925 and ASTM D2244, respectively, after irradiating the specimen with γ-rays at 25 kGy and leaving the specimen for 7 days.

(2) Transmittance after irradiation with γ-rays (unit: %): Transmittance (total luminous transmittance) is measured on a 3.2 mm thick specimen in accordance with ASTM D1003 after irradiating the specimen with γ-rays at 25 kGy and leaving the specimen for 7 days.

(3) Notched Izod impact strength after irradiation with γ-rays (unit: kgf·cm/cm): Izod impact strength is measured on a 3.2 mm thick Izod specimen in accordance with ASTM D256 after irradiating the specimen with γ-rays at 25 kGy and leaving the specimen for 7 days.

Conversely, it can be seen that the polycarbonate resin composition of Comparative Example 1 not including any colorant has poor properties in terms of color (YI, a*, and b*) and ionizing radiation resistance (discoloration resistance) after being irradiated with ionizing radiation, the polycarbonate resin compositions of Comparative Examples 2 and 3 including a typical colorant (D) instead of the anthraquinone colorant (C) according to the present invention have considerably low transparency (transmittance) and exhibit relatively poor properties in terms of color and ionizing radiation resistance (discoloration resistance) after being irradiated with ionizing radiation, as compared with those of Examples, and the polycarbonate resin compositions of Comparative Examples 4 to and 5 including both the anthraquinone colorant (C) and a typical colorant (D) exhibit relatively poor properties in terms of color, ionizing radiation resistance (discoloration resistance), and transparency after being irradiated with ionizing radiation, as compared with those of Examples.

Although some embodiments have been described herein, it should be understood that these embodiments are provided for illustration only and are not to be construed in any way

TABLE 1

| | | Example | | | | | |
|---|---|---|---|---|---|---|---|
| | | 1 | 2 | 3 | 4 | 5 | 6 |
| (A) (parts by weight) | | 100 | 100 | 100 | 100 | 100 | 100 |
| (B) (parts by weight) | | 0.75 | 0.75 | 0.75 | 0.75 | 0.75 | 0.75 |
| (C) (parts by weight) | (C1) | 0.00039 | 0.00035 | 0.00033 | 0.00028 | 0.00044 | 0.00039 |
| | (C2) | 0.00051 | 0.00055 | 0.00057 | 0.00042 | 0.00066 | 0.00051 |
| (D) (parts by weight) | (D1) | — | — | — | — | — | — |
| | (D2) | — | — | — | — | — | — |
| (E) (parts by weight) | | — | — | — | — | — | 0.04 |
| a* after irradiation with γ-rays | | −0.8 | −0.8 | −0.8 | −0.6 | −0.9 | −0.5 |
| b* after irradiation with γ-rays | | 0.9 | 0.9 | 0.9 | 0.7 | 1.0 | 0.3 |
| YI after irradiation with γ-rays | | 0.6 | 0.6 | 0.6 | 0.5 | 0.7 | −0.1 |
| Transmittance after irradiation with γ-rays (%) | | 80 | 80 | 80 | 81 | 80 | 84 |
| Izod impact strength after irradiation with γ-rays (kgf · cm/cm) | | 98 | 98 | 98 | 99 | 98 | 99 |

TABLE 2

| | | Comparative Example | | | | |
|---|---|---|---|---|---|---|
| | | 1 | 2 | 3 | 4 | 5 |
| (A) (parts by weight) | | 100 | 100 | 100 | 100 | 100 |
| (B) (parts by weight) | | 0.75 | 0.75 | 0.75 | 0.75 | 0.75 |
| (C) (parts by weight) | (C1) | — | — | — | 0.00035 | — |
| | (C2) | — | — | — | — | 0.00055 |
| (D) (parts by weight) | (D1) | — | 0.00039 | 0.00035 | — | 0.00035 |
| | (D2) | — | 0.00051 | 0.00055 | 0.00055 | — |
| (E) (parts by weight) | | — | — | — | — | — |
| a* after irradiation with γ-rays | | −8.0 | −6.1 | −5.8 | −3.5 | −6.4 |
| b* after irradiation with γ-rays | | 22.8 | 15.8 | 15.3 | −1.9 | 23.0 |
| YI after irradiation with γ-rays | | 31.1 | 23.5 | 21.3 | 4.3 | 26.0 |
| Transmittance after irradiation with γ-rays (%) | | 84 | 65 | 68 | 75 | 70 |
| Izod impact strength after irradiation with γ-rays (kgf · cm/cm) | | 99 | 99 | 99 | 99 | 98 |

From Tables 1 and 2, it can be seen that the polycarbonate resin compositions according to the present invention (Examples 1 to 6) are nearly colorless and exhibit excellent properties in terms of transparency and impact resistance after being irradiated with ionizing radiation.

as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A polycarbonate resin composition comprising:
a polycarbonate resin;
a polyalkylene glycol compound; and
an anthraquinone colorant comprising a red anthraquinone colorant and a violet anthraquinone colorant in a weight ratio of from 1:1.30 to 1:1.72,
wherein the polycarbonate resin composition has a yellow index (YI) of about −2 to about 2, as measured in accordance with ASTM D1925 after irradiating an about 3.2 mm thick specimen with γ-rays at about 25 kGy and leaving the specimen for 7 days and has an a* value of about −2 to about 2 and a b* value of −2 to about 2 as measured in accordance with ASTM D2244 after irradiating an about 3.2 mm thick specimen with γ-rays at about 25 kGy and leaving the specimen for 7 days.

2. The polycarbonate resin composition according to claim 1, comprising the polyalkylene glycol compound in an amount of about 0.4 parts by weight to about 1 parts by weight based on about 100 parts by weight of the polycarbonate resin, and the anthraquinone colorant in an amount of about 0.0001 parts by weight to about 0.002 parts by weight based on about 100 parts by weight of the polycarbonate resin.

3. The polycarbonate resin composition according to claim 1, further comprising: an epoxy ester compound represent by Formula 1:

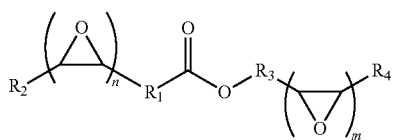

[Formula 1]

wherein $R_1$ and $R_3$ are the same or different and are each independently a $C_1$ to $C_{10}$ hydrocarbon group; $R_2$ and $R_4$ are the same or different and are each independently a hydrogen atom or a $C_1$ to $C_{10}$ hydrocarbon group, wherein $R_1$ and $R_2$ are optionally connected to one another to form a ring and/or $R_3$ and $R_4$ are optionally connected to one another to form a ring; m and n are the same or different and are each independently 0 or 1; and m+n is 1 or 2.

4. The polycarbonate resin composition according to claim 3, comprising the epoxy ester compound in an amount of about 0.001 parts by weight to about 3 parts by weight based on about 100 parts by weight of the polycarbonate resin.

5. The polycarbonate resin composition according to claim 1, wherein the polycarbonate resin composition has a transmittance of about 80% or higher, as measured in accordance with ASTM D1003 after irradiating an about 3.2 mm thick specimen with γ-rays at about 25 kGy and leaving the specimen for about 7 days.

6. The polycarbonate resin composition according to claim 1, wherein the polycarbonate resin composition has an Izod impact strength of about 90 kgf cm/cm or higher, as measured in accordance with ASTM D256 after irradiating an about 3.2 mm thick Izod specimen with γ-rays at about 25 kGy and leaving the specimen for about 7 days.

7. A molded article formed of the polycarbonate resin composition according to claim 1.

8. The molded article according to claim 7, wherein the molded article is an ionizing radiation resistant medical supply article.

* * * * *